United States Patent
Winter et al.

(10) Patent No.: US 8,575,267 B2
(45) Date of Patent: Nov. 5, 2013

(54) PROCESS FOR HYDROLYZING POLYMERS CONTAINING VINYLCARBOXAMIDE UNITS

(75) Inventors: Manfred Winter, Dittelsheim-Hessloch (DE); Hagen Weigl, Ladenburg (DE); Hans-Joachim Haehnle, Neustadt (DE); Andreas Kramer, Friedelsheim (DE)

(73) Assignee: BASF SE, Ludwigshafen (DE)

( * ) Notice: Subject to any disclaimer, the term of this patent is extended or adjusted under 35 U.S.C. 154(b) by 169 days.

(21) Appl. No.: 13/127,720

(22) PCT Filed: Nov. 2, 2009

(86) PCT No.: PCT/EP2009/064424
§ 371 (c)(1),
(2), (4) Date: May 5, 2011

(87) PCT Pub. No.: WO2010/052179
PCT Pub. Date: May 14, 2010

(65) Prior Publication Data
US 2011/0207882 A1    Aug. 25, 2011

(30) Foreign Application Priority Data

Nov. 5, 2008    (EP) .................................... 08168363

(51) Int. Cl.
*C08F 8/12*    (2006.01)
*C08F 26/02*    (2006.01)
*C08F 20/54*    (2006.01)

(52) U.S. Cl.
USPC ........... 525/52; 525/328.2; 525/355; 525/369

(58) Field of Classification Search
USPC ................... 525/328.2, 52, 355, 369
See application file for complete search history.

(56) References Cited

U.S. PATENT DOCUMENTS

| 4,255,548 A | | 3/1981 | Wingard, Jr. et al. | |
|---|---|---|---|---|
| 4,393,174 A | | 7/1983 | Dawson et al. | |
| 4,444,667 A | * | 4/1984 | Burkert et al. | ................ 210/735 |
| 4,623,699 A | | 11/1986 | Brunnmueller et al. | |
| 4,943,676 A | | 7/1990 | Pinschmidt, Jr. et al. | |
| 5,324,792 A | | 6/1994 | Ford | |
| 5,401,808 A | | 3/1995 | Ford | |
| 5,491,199 A | | 2/1996 | Ford et al. | |
| 6,114,435 A | * | 9/2000 | Nilz et al. | ..................... 524/548 |

FOREIGN PATENT DOCUMENTS

| DE | 197 10 212 | 9/1998 |
|---|---|---|
| EP | 0 071 050 | 2/1983 |
| EP | 0 339 371 | 11/1989 |
| WO | 01 05847 | 1/2001 |

OTHER PUBLICATIONS

Church et al., Ind. Eng. Chem. Prod. Res. Dev. 20 (1981) 371-378.*
International Search Report issued Dec. 3, 2009 in PCT/EP09/064424 filed Nov. 2, 2009.

* cited by examiner

*Primary Examiner* — Roberto Rabago
(74) *Attorney, Agent, or Firm* — Oblon, Spivak, McClelland, Maier & Neustadt, L.L.P.

(57) ABSTRACT

A process for the hydrolysis of polymers comprising vinylcarboxamide units by heating polymers comprising vinylcarboxamide units in an aqueous medium in the presence of acids or bases, wherein an aqueous solution or dispersion of a polymer comprising vinylcarboxamide units and an aqueous solution or a base or acid are fed continuously to a tubular reactor at elevated pressure, from 0.05 to less than one equivalent of a base or acid being used per vinylcarboxamide equivalent and the mixture being passed through the tubular reactor at a temperature of >100° C. to 250° C., depressurized and cooled.

11 Claims, No Drawings

PROCESS FOR HYDROLYZING POLYMERS CONTAINING VINYLCARBOXAMIDE UNITS

The invention relates to a process for the hydrolysis of polymers comprising vinylcarboxamide units by heating polymers comprising vinylcarboxamide units in an aqueous medium in the presence of acids or bases.

U.S. Pat. No. 4,393,174 discloses a process for the hydrolysis of polymers which comprise amide side groups, for example polymers of N-vinylformamide and N-vinylacetamide. The hydrolysis is effected in the presence of from 1 to 2, preferably from 1.1 to 1.5, equivalents of a base, such as sodium hydroxide solution or potassium hydroxide solution, based on one equivalent of the polymer to be hydrolyzed, at a temperature in the range of from 110 to 170° C. The duration of the reaction is from 1 hour to 48 hours.

EP-A-0 071 050 discloses hydrolyzed polyvinylformamides whose formyl groups are hydrolyzed either completely or to a degree of from 20 to 90% with formation of amino groups. The hydrolysis can be carried out at temperatures from 40 to 180° C. in the presence of from 0.05 to 1.5 equivalents of a mineral acid or base. It is preferably effected in the temperature range from 70 to 90° C. in aqueous solution with hydrochloric acid or sodium hydroxide solution.

U.S. Pat. No. 4,623,699 discloses a process for the preparation of pulverulent polymers comprising vinylamine units by eliminating formyl groups from polymers comprising vinylformamide units, pulverulent polymers of N-vinylformamide being reacted with a gaseous hydrohalic acid in the presence of not more than 5% by weight of water at temperatures up to 200° C.

According to the process disclosed in EP-A-0 339 371, particles of copolymers which comprise vinyl alcohol units and vinylformamide units, suspended in methanol, are hydrolyzed in the presence of from 0.7 to 3, preferably from 1 to 1.5, equivalents of a base or acid at temperatures from 50 to 80° C. The hydrolysis can also be carried out continuously.

U.S. Pat. No. 4,943,676 discloses a process for the preparation of polyvinylamines, polyvinylformamide or copolymers of N-vinylformamide being thermally decarbonylated at a temperature of from 200 to 320° C. under a pressure of from 15 to 90 bar.

U.S. Pat. No. 5,401,808 and U.S. Pat. No. 5,324,792 disclose a terpolymer and a process for the preparation of a terpolymer which comprises vinylamine, vinylformamide and amidine units, polyvinylformamide being hydrolyzed at temperatures above 90° C. to below 175° C. in an aqueous medium which comprises less than 50% by weight of ammonia or an alkylamine. The pressure is adjusted so that the reactants are always present in the liquid phase under the reaction conditions. After the hydrolysis, ammonia or the amine is removed from the aqueous solution and salt-free polymers are obtained.

U.S. Pat. No. 5,491,199 discloses salt-free polymers comprising vinylamine units. They are obtained by heating polymers comprising vinylformamide units to a temperature of from 50 to 225° C. in an aqueous medium in the presence of a catalyst from the group consisting of the transition metals of group VIII of the Periodic Table of the Elements, vanadium, chromium, manganese, copper and zinc.

According to the continuous process disclosed in DE-A-197 10 212, water-containing powders of N-vinylformamide polymers are hydrolyzed in the presence of from 0.5 to 1.5 equivalents of a base or acid in the temperature range from 20 to 100° C. in a reaction vessel which is equipped with at least two parallel, rotating stirrer shafts with stirring members.

It is the object of the invention to provide a further process for the preparation of compounds comprising vinylamine units. In a partial hydrolysis, the degree of hydrolysis of the polymers should be reproducibly adjustable to a defined value and should vary only within very narrow limits.

The object is achieved, according to the invention, by a process for the hydrolysis of polymers comprising vinylcarboxamide units by heating polymers comprising vinylcarboxamide units in an aqueous medium in the presence of acids or bases, if an aqueous solution or dispersion of a polymer comprising vinylcarboxamide units and an aqueous solution of a base or acid are fed continuously to a tubular reactor at elevated pressure, from 0.1 to less than one equivalent of a base or acid being used per vinylcarboxamide equivalent and the mixture being passed through the tubular reactor at a temperature of >100° C. to 250° C., depressurized and cooled.

Polymers comprising vinylcarboxamide units are disclosed, for example, in the literature mentioned in connection with the prior art. They are obtained by polymerizing
(i) at least one monomer of the formula

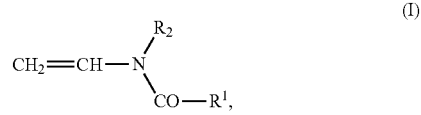

in which $R^1$, $R^2$ are H or $C_1$- to $C_6$-alkyl,
and optionally
(ii) at least one other monoethylenically unsaturated monomer and optionally
(iii) at least one crosslinking monomer having at least two double bonds in the molecule.

Examples of monomers of the formula I are N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide and N-vinylbutyramide. The monomers in group (i) are preferably polymerized alone to give homopolymers. A preferably used monomer of this group is N-vinylformamide (in formula I, $R^1$ and $R^2$ are then H).

Also of industrial importance are copolymers of monomers of the formula I with other ethylenically unsaturated monomers. They are obtainable by copolymerization of
(i) at least one N-vinylcarboxamide together with
(ii) at least one other monoethylenically unsaturated monomer.

Examples of monomers of group (ii) are esters of α,β-ethylenically unsaturated mono- and dicarboxylic acids with $C_1$-$C_{30}$-alkanols, $C_2$-$C_{30}$-alkanediols and $C_2$-$C_{30}$-aminoalcohols, amides of α,β-ethylenically unsaturated monocarboxylic acids and their N-alkyl and N,N-dialkyl derivatives, nitriles of α,β-ethylenically unsaturated mono- and dicarboxylic acids, esters of vinyl alcohol and allyl alcohol with $C_1$-$C_{30}$-monocarboxylic acids, N-vinyllactams, dialkyldiallylammonium halides, nitrogen-containing heterocycles having α,β-ethylenically unsaturated double bonds, vinylaromatics, vinyl halides, vinylidene halides, $C_2$-$C_8$-monoolefins and mixtures thereof.

Suitable representatives are, for example, methyl (meth) acrylate (here as well as in the following text, this notation indicates both "acrylates" and "methacrylates"), methyl ethacrylate, ethyl (meth)acrylate, ethyl ethacrylate, n-butyl (meth)acrylate, isobutyl (meth)acrylate, tert-butyl (meth)

acrylate, tert-butyl ethacrylate, n-octyl (meth)acrylate, 1,1,3,3-tetramethylbutyl (meth)acrylate, ethylhexyl (meth)acrylate and mixtures thereof.

Suitable additional monomers of group (ii) are furthermore the esters of α,β-ethylenically unsaturated mono- and dicarboxylic acids with aminoalcohols, preferably $C_2$-$C_{12}$-aminoalcohols. These can be $C_1$-$C_8$-monoalkylated or -dialkylated on the amine nitrogen. For example, acrylic acid, methacrylic acid, fumaric acid, maleic acid, itaconic acid, crotonic acid, maleic anhydride, monobutyl maleate and mixtures thereof are suitable as the acid component of these esters. Acrylic acid, methacrylic acid and mixtures thereof are preferably used. These include, for example, N-methylaminomethyl (meth)acrylate, N-methylaminoethyl (meth)acrylate, N,N-dimethylaminomethyl (meth)acrylate, N,N-dimethylaminoethyl (meth)acrylate, N,N-diethylaminoethyl (meth)acrylate, N,N-dimethylaminopropyl (meth)acrylate, N,N-diethylaminopropyl (meth)acrylate and N,N-dimethylaminocyclohexyl (meth)acrylate.

Also suitable as monomers of group (ii) are the quaternization products of the above basic compounds with, for example, a $C_1$-$C_8$-alkyl chloride, $C_1$-$C_8$-dialkylsulfate, $C_1$-$C_{16}$-epoxides or benzyl chloride.

Furthermore suitable as monomers of group (ii) are 2-hydroxyethyl (meth)acrylate, 2-hydroxyethyl ethacrylate, 2-hydroxypropyl (meth)acrylate, 3-hydroxypropyl (meth)acrylate, 3-hydroxybutyl (meth)acrylate, 4-hydroxybutyl (meth)acrylate, 6-hydroxyhexyl (meth)acrylate and mixtures thereof.

Suitable additional monomers of group (ii) are furthermore acrylamide, methacrylamide, N-methyl(meth)acrylamide, N-ethyl(meth)acrylamide, n-propyl(meth)acrylamide, N-(n-butyl)(meth)acrylamide, tert-butyl(meth)acrylamide, n-octyl (meth)acrylamide, 1,1,3,3-tetramethylbutyl(meth)acrylamide, ethylhexyl(meth)acrylamide and mixtures thereof.

In addition, N-[2-(dimethylamino)ethyl]acrylamide, N-[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide, N-[4-(dimethylamino)butyl]methacrylamide, N-[2-(diethylamino)ethyl]acrylamide, N-[2-(diethylamino)ethyl]methacrylamide and mixtures thereof are suitable as further monomers of group (ii). The quaternization products of the above compounds with, for example, a $C_1$-$C_8$-alkyl chloride, $C_1$-$C_8$-dialkyl sulfate, $C_1$-$C_{16}$-epoxides and benzyl chloride, and dimethyldiallylammonium chloride and diethyldiallylammonium chloride, are furthermore suitable as monomers of group (ii).

Further examples of monomers of group (ii) are nitriles of α,β-ethylenically unsaturated mono- and dicarboxylic acids, such as, for example, acrylonitrile and methacrylonitrile. Suitable monomers of group (ii) are furthermore N-vinyllactams and derivatives thereof which may have, for example, one or more $C_1$-$C_6$-alkyl substituents (as defined above). These include N-vinylpyrrolidone, N-vinylpiperidine, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, N-vinyl-7-ethyl-2-caprolactam and mixtures thereof.

N-vinylimidazoles and alkylvinylimidazoles are furthermore suitable as monomers of group (ii), in particular methylvinylimidazoles, such as, for example, 1-vinyl-2-methylimidazole, 3-vinylimidazole N-oxide, 2- and 4-vinylpyridine N-oxides and betaine derivatives and quaternization products of these monomers and ethylene, propylene, isobutylene, butadiene, styrene, α-methyl styrene, vinyl acetate, vinyl propionate, vinyl chloride, vinylidene chloride, vinyl fluoride, vinylidene fluoride and mixtures thereof are furthermore suitable as monomers of group (ii).

Anionic monomers are also suitable as other monoethylenically unsaturated monomers of group (ii). They can, optionally, be copolymerized with the neutral and/or cationic monomers described above.

Examples of anionic monomers of the group are enthlenically unsaturated $C_3$- to $C_8$-carboxylic acids, such as, for example, acrylic acid, methacrylic acid, dimethacrylic acid, ethacrylic acid, maleic acid, fumaric acid, itaconic acid, mesaconic acid, citraconic acid, methylenemalonic acid, allylacetic acid, vinylacetic acid and crotonic acid. Suitable monomers of this group are also monomers comprising sulfo groups, such as vinylsulfonic acid, acrylamido-2-methylpropane sulfonic acid, methallyl sulfonic acid, styrene sulfonic acid and the alkyl-substituted derivatives thereof and monomers comprising phosphonic groups, such as vinyl phosphonic acid. The monomers of this group can be used alone or as a mixture with one another, in partly or completely neutralized form, in the copolymerization with the monomers of group (i). For example, alkali metal or alkaline earth metal bases, ammonia, amines and/or alkanolomines are used for neutralization. Examples of these are sodium hydroxide solution, potassium hydroxide solution, sodium carbonate, potassium carbonate, sodium bicarbonate, magnesium oxide, calcium hydroxide, calcium oxide, triethanolamine, ethanolamine, morpholine, diethylenetriamine or tetraethylenepentamine.

The abovementioned monomers of group (ii) can be used individually or in the form of any mixtures in the copolymerization with a vinylcarboxamide. Typically, they are used in amounts of from 1 to 90 mol %, preferably from 10 to 80 mol % and particularly preferably from 10 to 60 mol %. For example, copolymers of (i) N-vinylformamide and (ii) acrylonitrile, copolymers of (i) N-vinylformamide,
(ii) acrylic acid, methacrylic acid and/or the alkali metal, alkaline earth metal or ammonium salts thereof and optionally acrylonitrile and/or methacrylonitrile are particularly preferred.

A further modification of the vinylcarboxamide copolymers is possible by using in the copolymerization monomers of group (iii) which comprise at least two double bonds in the molecule, e.g. triallylamine, methylenebisacrylamide, glycol diacrylate, glycol dimethacrylate, glyceryl triacrylate, pentaerythrityl triallyl ether, polyalkylene glycols which are at least diesterified with acrylic acid and/or methacrylic acid or polyols, such as pentaerythritol, sorbitol or glucose. The monomers of group (iii) can be copolymerized either alone or with at least one monomer of group (i) or with at least one monomer of groups (i) and (ii). If at least one monomer of the above group is used in the polymerization, the amounts used are up to 2 mol %, e.g. from 0.001 to 1 mol %, based on the monomers used altogether.

Furthermore, for modifying the polymers, it may be expedient to combine the use of above crosslinking agents with the addition of chain-transfer agents. Typically, from 0.001 to 5 mol % are used. All chain-transfer agents known from the literature, e.g. sulfur compounds, such as mercaptoethanol, 2-ethylhexyl thioglycolate, thioglycolic acid and dodecyl mercaptan, and sodium hypophosphite, formic acid and tribromochloromethane, can be used.

The polymers comprising vinylcarboxamide units also include graft polymers of N-vinylcarboxamides, for example graft polymers of N-vinylformamide on polyalkylene glycols, polyvinyl acetate, polyvinyl alcohol, polyvinyl formamides, polysaccharides, such as starch, oligosaccharides or monosaccharides. The graft polymers are obtainable by free radical polymerization of a N-vinylcarboxamide, in particular N-vinylformamide, in an aqueous medium the presence of at least one of said grafting bases, optionally together with copolymerizable other monomers.

The preparation of the above-described homo- and copolymers comprising vinylcarboxamide units can be effected by solution, precipitation, suspension or emulsion polymerization. Solution polymerization in aqueous media is preferred. Suitable aqueous media are water and mixtures of water and at least one water-miscible solvent, e.g. an alcohol, such as methanol, ethanol, n-propanol or isopropanol. The polymers comprising vinylcarboxamide units have, for example, K values (determined according to H. Fikentscher in 5% strength aqueous sodium chloride solution at pH 7, a polymer concentration of 0.5% by weight and a temperature of 25° C.) in the range from 20 to 250, preferably from 50 to 180.

In order to hydrolyze the polymers comprising vinylcarboxamide units, they are first dissolved or dispersed in water. The polymer concentration of the aqueous solution or dispersion is, for example, from 1 to 60% by weight, preferably from 5 to 45% by weight. The polymer solution is then fed with an aqueous solution of a base or acid to a tubular reactor. The two components can be metered separately from one another into the tubular reactor or they are preferably mixed before entry into the tubular reactor, for example in a mixer. During the mixing process, thereafter or before, water can, optionally, be added in order to adjust the viscosity of the solution to be hydrolyzed. The viscosity of this solution is, for example, in the range from 50 to 20 000 mPa·s, preferably from 100 to 7500 mPa·s, at a temperature of 20° C. In one embodiment of the process according to the invention, the mixture to be hydrolyzed and comprising polymer comprising vinylcarboxamide units and a base or an acid is heated to a temperature of, for example, from 80 to 100° C. before entering into the tubular reactor. It is particularly advantageous to heat the reaction mixture to the respective hydrolysis temperature even before metering into the reactor. The reaction mixture is then pumped into the reactor and, therein, is passed through the reactor at temperatures in the range from >100° C. to 250° C. at an elevated pressure, which results from the temperature and/or is imposed from outside by a pressure generator, such as, for example, a pump, at which the hydrolysis is carried out. The pressure in the tubular reactor is, for example, from 1 to 40 bar and is generally in the range from 1.5 to 10 bar. The temperature in the tubular reactor during the hydrolysis is generally from 120 to 180° C. and is preferably in the range from 130 to 160° C.

In the hydrolysis with bases, for example, aqueous solutions of hydroxides of the first and second main group on the Periodic Table of the Elements, such as lithium hydroxide, sodium hydroxide, potassium hydroxide, calcium hydroxide or barium hydroxide, are used. Aqueous solutions of potassium hydroxide or sodium hydroxide are preferably used as the base. The concentration of the bases in the aqueous solution is, for example, from 10 to 50% by weight, preferably from 20 to 40% by weight.

Acids suitable for the hydrolysis are, for example, mineral acids, such as aqueous solutions of hydrogen halides, sulfuric acid, nitric acid or phosphoric acid, or aliphatic or aromatic sulfonic acids, such as methane sulfonic acid, benzene sulfonic acid or toluene sulfonic acid. For example, $C_1$- to $C_5$-carboxylic acids, such as formic acid, acetic acid or propionic acid, are also suitable as acids for the hydrolysis.

For example, from 0.05 to less than one equivalent of a base or acid is used per vinylcarboxamide equivalent; in general, from 0.2 to 0.9 equivalent of a base or of an acid is used.

Sodium hydroxide solution is particularly preferably used in the hydrolysis.

The aqueous mixture pumped into the tubular reactor and comprising vinylcarboxamide and base or acid passes through the tubular reactor so to speak in the form of plug flow. In order to achieve plug flow as closely as possible, the tubular reactor has at least one mixing element. In general, it comprises a plurality of mixing elements, for example from 2 to 50, preferably from 3 to 30.

The tubular reactor preferably has a ratio of diameter to length of from 1:10 to 1:20,000, and preferably has a ratio of diameter to length of from 1:20 to 1:2,000.

The reaction mixture is passed continuously through the tubular reactor, an amount fed to the reactor continuously per unit time at the beginning of the reactor being removed continuously at the end of the tubular reactor and depressurized. The expression "continuously" is also intended to comprise intermittent removal of the reaction product from the tubular reactor. The residence time of the reaction mixture in the tubular reactor is, for example, from 10 seconds to 2 hours, preferably from 1 to 60 minutes.

The reaction mixture which leaves the tubular reactor can be cooled before or after the depressurization with the aid of a heat exchanger, for example to a temperature in the range from 10 to 80° C.

The reaction mixture can then be neutralized. If a base was used in the hydrolysis, it is neutralized with an acid. The pH is adjusted to a value in the range of, for example, from 5.0 to 9.0. The heat of neutralization evolved during the neutralization can be utilized, for example, by passing the neutralized reaction mixture through a heat exchanger. In the process according to the invention, completely or partly hydrolyzed vinylcarboxamide polymers are obtained, depending on the reaction conditions chosen in each case. The degree of hydrolysis of the vinylcarboxamide units present in the polymer is, for example, from 1 to 100 mol %. In the case of a partial hydrolysis, it is generally in the range from 5 to 98, preferably from 10 to 95, mol %.

In the hydrolysis, a vinylamine unit (II):

where the substituents $R^1$, $R^2$ are H or $C_1$- to $C_6$-alkyl, forms from the polymers which comprise the compounds of the formula I incorporated in the form of polymerized units, with elimination of the —CO—$R^1$ group. The molar masses $M_w$ of the hydrolyzed polymers are, for example, from 5000 to 15 million, in general from 10 000 to 5 million (measured by the light scattering method).

In the process according to the invention, partly hydrolyzed polyvinylcarboxamides which have only a small variation in the degree of hydrolysis compared with polyvinylcarboxamides hydrolyzed by a batchwise method can be prepared in a readily reproducible manner.

In the process according to the invention, homopolymers of N-vinylformamide or copolymers of N-vinylformamide are preferably hydrolyzed. The hydrolyzed polymers are used, for example, as fixing agents, strength agents, flocculants and retention aids in the production of paper.

The K values of the polymers were determined according to H. Fikentscher, Cellulose-Chemie, volume 13, 58-64 and 71-74 (1932) in 5% strength aqueous sodium chloride solution at a pH of 7, a polymer concentration of 0.5% by weight and a temperature of 25° C.

The degree of hydrolysis of the polymers is defined as the mole fraction in percent of the vinylformamide units which were hydrolyzed. It was determined by polyelectrolyte titration at a pH of 3.5 according to D. Horn et al., Progr. Colloid & Polymer Sci., volume 65, 251-264 (1978).

EXAMPLES

A constant stream of a 20% strength by weight aqueous solution of a homopolymer of N-vinylformamide having a K value of 90 ($M_w$ was about 340 000) and the amounts of 25% strength aqueous sodium hydroxide solution (in mol %, based on vinylformamide units) stated in each case in the table were pumped from a storage vessel into a mixer. The reaction mixture was then pumped under a pressure of 15 bar into a tubular reactor, said reaction mixture having been heated in a heat exchanger to the temperature which is stated in each case in the table and at which the hydrolysis was carried out. The tubular reactor used had a ratio of length to diameter of 160 and comprised 6 mixing elements distributed over the reactor. The flow rate of the reaction mixture through the tubular reactor was adapted so that the hydrolyzed polymer at the end of the tubular reactor had the desired degree of hydrolysis, which is likewise stated in the table for the individual examples. Immediately after the depressurization and the emergence of the product stream from the tubular reactor, the solution was cooled to a temperature of 40° C. with the aid of a heat exchanger and 30% strength aqueous hydrochloric acid was added in an amount such that the pH of the hydrolysis product was 7.0. With the aid of a further heat exchanger, the heat of neutralization was finally removed. The reaction conditions are stated in the table.

The products obtained in each case were tested as dry strength agents for paper and compared with samples of polyvinylformamides hydrolyzed by a batchwise method.

No significant difference was found with regard to bursting strength, SCT value and CMT value. The properties were determined by the following methods:

Bursting strength according to DIN ISO 2758 (up to 600 kPa), DIN ISO 2759 (from 600 kPa)

SCT according to DIN 54518 (determination of the short span compressive strength)

CMT according to DIN EN 23035 (determination of the flat crush resistance)

DIN EN ISO 7263 (determination of the flat crush resistance of laboratory-fluted corrugated board)

TABLE

| Example No. | Temperature | Added amount of NaOH*) | Residence time/ Hydrolysis time | Degree of hydrolysis*) | Solids content |
|---|---|---|---|---|---|
| 1 | 140° C. | 25% | 21 min | 30% | 16% |
| 2 | 140° C. | 42% | 19 min | 50% | 18% |
| 3 | 140° C. | 80% | 25 min | >95% | 21% |
| 4 | 130° C. | 44% | 39 min | 50% | 18% |
| 5 | 160° C. | 38% | 10 min | 50% | 18% |

*)in mol %, based on the vinylformamide structural units

What is claimed is:

1. A process for the hydrolysis of polymers comprising vinylcarboxamide units comprising heating polymers comprising vinylcarboxamide units in an aqueous medium in the presence of acids or bases, wherein an aqueous solution or dispersion of a polymer comprising vinylcarboxamide units and an aqueous solution of a base or acid are fed continuously to a tubular reactor at elevated pressure, from 0.1 to less than one equivalent of a base or acid being used per vinylcarboxamide equivalent and the mixture being passed through the tubular reactor at a temperature of >100° C. to 250° C., depressurized and cooled.

2. The process according to claim 1, wherein the mixture is passed through the tubular reactor at a temperature of from 120 to 180° C.

3. The process according to claim 1, wherein the tubular reactor has a ratio of diameter to length of from 1:10 to 1:20 000.

4. The process according to claim 1, wherein the tubular reactor has a ratio of diameter to length of from 1:20 to 1:2000.

5. The process according to claim 1, wherein the reaction mixture is fed at least approximately in the form of plug flow through the reactor.

6. The process according to claim 1, wherein the residence time of the reaction mixture in the tubular reactor is from 10 seconds to 1 hour.

7. The process according to claim 1, wherein the polymers comprising vinylcarboxamide units are obtainable by polymerization of
(i) at least one monomer of the formula

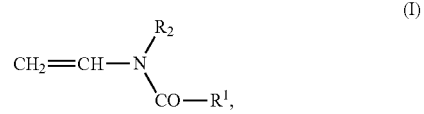

in which $R^1$, $R^2$ are H or $C_1$- to $C_6$-alkyl,
and optionally
(ii) at least one other monoethylenically unsaturated monomer and optionally
(iii) at least one crosslinking monomer having at least two double bonds in the molecule.

8. The process according to claim 1, wherein homopolymers of N-vinylformamide are hydrolyzed.

9. The process according to claim 1, wherein copolymers of N-vinylformamide are hydrolyzed.

10. The process according to claim 1, wherein the aqueous solution is of a base.

11. The process according to claim 1, wherein the aqueous solution is of an acid.

* * * * *